(12) United States Patent
Anagnos et al.

(10) Patent No.: US 11,348,053 B2
(45) Date of Patent: May 31, 2022

(54) GENERATING PREDICTIVE INFORMATION ASSOCIATED WITH VEHICLE PRODUCTS/SERVICES

(71) Applicant: Continental Automotive Systems, Inc., Auburn Hills, MI (US)

(72) Inventors: Themi Anagnos, La Grange Park, IL (US); Robert Faust D'Avello, Lake Zurich, IL (US); Robert Allen Gee, Lake Barrington, IL (US); Tomasz J. Kaczmarski, Lake Forest, IL (US); Brian Droessler, Grayslake, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 15/575,201

(22) PCT Filed: May 16, 2016

(86) PCT No.: PCT/US2016/032725
§ 371 (c)(1),
(2) Date: Nov. 17, 2017

(87) PCT Pub. No.: WO2016/187129
PCT Pub. Date: Nov. 24, 2016

(65) Prior Publication Data
US 2018/0150776 A1 May 31, 2018

Related U.S. Application Data

(60) Provisional application No. 62/164,183, filed on May 20, 2015, provisional application No. 62/164,187, filed on May 20, 2015.

(51) Int. Cl.
*G06Q 10/06* (2012.01)
*G06Q 10/04* (2012.01)
(Continued)

(52) U.S. Cl.
CPC .......... *G06Q 10/067* (2013.01); *G06Q 10/04* (2013.01); *G06Q 30/0201* (2013.01);
(Continued)

(58) Field of Classification Search
USPC ........................................................ 705/7.31
See application file for complete search history.

(56) References Cited

U.S. PATENT DOCUMENTS 6,441,748 B1 * 8/2002 Takagi ............. G08G 1/096716
324/634
6,609,051 B2 8/2003 Fiechter et al.
(Continued)

FOREIGN PATENT DOCUMENTS

CA 3099982 A1 11/2019
CN 103838929 A 6/2014
(Continued)

OTHER PUBLICATIONS

International Search Report and Written Opinion dated Jul. 22, 2016 from corresponding International patent application PCT/US2016/032725.
(Continued)

*Primary Examiner* — Folashade Anderson

(57) ABSTRACT

Methods and systems include receiving vehicle data that is associated, at least in part, with one or more vehicle-related products/services. One or more predictions that are associated with the one or more vehicle-related products/services are determined. The one or more predictions are based, at least in part, on the vehicle data.

29 Claims, 8 Drawing Sheets

(51) Int. Cl.
  *G06Q 30/02* (2012.01)
  *G07C 5/00* (2006.01)
  *G07C 5/02* (2006.01)
  *G07C 5/08* (2006.01)

(52) U.S. Cl.
  CPC ......... *G06Q 30/0202* (2013.01); *G07C 5/008* (2013.01); *G07C 5/02* (2013.01); *G07C 5/0841* (2013.01)

(56) References Cited

U.S. PATENT DOCUMENTS

| | | | |
|---|---|---|---|
| 8,154,438 B1* | 4/2012 | Larson | G01S 5/16 342/118 |
| 9,043,076 B2 | 5/2015 | Bou-Ghannam et al. | |
| 9,103,687 B1* | 8/2015 | Loo | G01C 21/3469 |
| 9,218,626 B1* | 12/2015 | Haller, Jr. | G06Q 40/08 |
| 10,423,934 B1 | 9/2019 | Zanghi et al. | |
| 10,650,621 B1* | 5/2020 | King | H04L 67/10 |
| 10,694,262 B1 | 6/2020 | Hedman et al. | |
| 2002/0007237 A1 | 1/2002 | Phung et al. | |
| 2002/0188506 A1 | 12/2002 | Smith | |
| 2007/0005202 A1* | 1/2007 | Breed | G07C 5/008 701/29.1 |
| 2007/0118502 A1* | 5/2007 | Aragones | G06Q 10/06 |
| 2010/0063668 A1 | 3/2010 | Zhang et al. | |
| 2011/0112719 A1* | 5/2011 | Marumoto | G01F 9/02 701/33.4 |
| 2011/0308308 A1* | 12/2011 | Herman | F02M 35/09 73/114.31 |
| 2014/0142948 A1* | 5/2014 | Rathi | G06F 3/167 704/270.1 |
| 2014/0279707 A1 | 9/2014 | Joshua et al. | |
| 2015/0039363 A1 | 2/2015 | Calabrese et al. | |
| 2015/0094927 A1* | 4/2015 | Takahashi | B60W 30/025 701/93 |
| 2019/0197798 A1* | 6/2019 | Abari | G06Q 50/30 |
| 2020/0023846 A1 | 1/2020 | Husain et al. | |
| 2020/0202636 A1* | 6/2020 | Andres | G06Q 50/30 |
| 2021/0042708 A1 | 2/2021 | Gardiner et al. | |
| 2021/0049839 A1 | 2/2021 | Bielby et al. | |
| 2021/0081907 A1 | 3/2021 | Solomon et al. | |
| 2021/0090359 A1 | 3/2021 | Griffiths et al. | |
| 2021/0235141 A1 | 7/2021 | Murphy et al. | |

FOREIGN PATENT DOCUMENTS

| | | |
|---|---|---|
| CN | 104010011 A | 8/2014 |
| CN | 104077915 A | 10/2014 |
| CN | 110852774 A | 2/2020 |
| DE | 10257793 A | 7/2004 |
| EP | 1809535 A | 7/2007 |
| KR | 20130100877 A | 9/2013 |
| KR | 20150042503 A | 4/2015 |
| WO | 2011049865 A | 4/2011 |

OTHER PUBLICATIONS

Search Report dated Dec. 2, 2015 of corresponding GB patent application No. GB1510375.7.
English Abstract of CN 104077915 A.
English Abstract of CN 104010011 A.
English Abstract of CN 103838929 A.
English Abstract of KR 20130100877 A.
English Abstract of DE 10257793 A.
Search Report dated Dec. 2, 2015 of corresponding GB patent application No. GB1510594.3.

* cited by examiner

GENERATING PREDICTIVE INFORMATION ASSOCIATED WITH VEHICLE PRODUCTS/SERVICES

A. BACKGROUND

The invention relates generally to the field of vehicle technology.

B. BRIEF DESCRIPTION OF THE DRAWINGS

Other objects and advantages of the invention may become apparent upon reading the detailed description and upon reference to the accompanying drawings.

Figure 1:
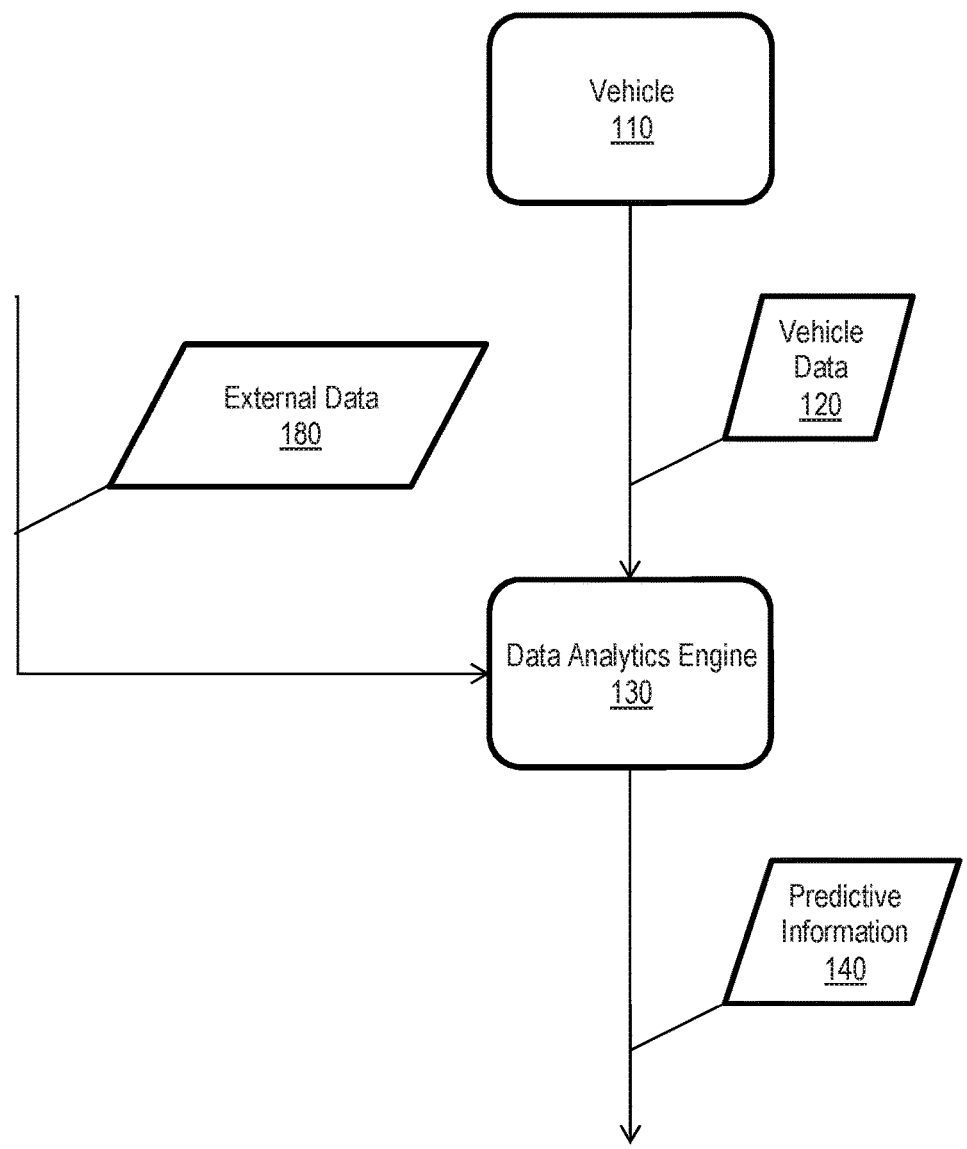
FIG. 1 is a diagram illustrating a system configured to predict information associated with vehicle products/services, in accordance with some embodiments.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

C. DETAILED DESCRIPTION

FIG. 1 is a diagram illustrating a system configured to predict information associated with vehicle products/services, in accordance with some embodiments.

In some embodiments, vehicle 110 is configured to collect vehicle data 120. Vehicle data 120 may contain information associated with one or more vehicle-related products/services. Vehicle data 120 may be provided to data analytics engine 130 for processing. In some embodiments, data analytics engine 130 may be configured to generate predictive information 140 that is associated with vehicle data 120 and/or the one or more products/services. It should be noted that vehicle data may be received from multiple vehicles/drivers and merged together by data analytics engine 130.

Generally, vehicle data 120 may include data from one or more sensors on a vehicle, as well as other vehicle data that may be associated with the one or more products/services such as vehicle identification details (make, model, miles, age, etc.), vehicle diagnostics data, and vehicle history. In some embodiments, vehicle data 120 may also be correlated with other types of data, such as map data and date/time data, for example.

In some embodiments, external data 180 may also be provided to data analytics engine 130. External data 180 may be related to the one or more products/services and may be data received from one or more external sources other than the vehicle(s). In some embodiments, external data 180 may include map-based data such as weather information, road functional class, conditions of various segments of the road, construction areas, road curvature, altitude maps, typical average speeds of various road segments, reported incidents, etc. External data may generally include examples such as those discussed in relation to other figures here.

In some embodiments, certain types of data may be received as both external data 180 and vehicle data 120. For example, weather data may be received as external data from a weather prediction service and may also be received from a vehicle as the weather data may be detected by one or more sensors on the vehicle.

Vehicle data 120 may include data on chassis conditions, chassis settings, various engine metrics, etc. Vehicle data 120 may also include data related to a driver's personal driving style. Such data may include g-vehicle data (indicating acceleration, in some embodiments, in all three directions), accelerator pedal input, brake pedal input, (optionally, clutch pedal input), steering input, gear shifting input, mode choices (sport mode, racing mode, city driving mode, etc.), etc.

In some embodiments, vehicle data may also include various details about the specific vehicle, such as the vehicle year, make, model, trim, extra options, number of miles, etc. In addition, vehicle data may include general information about the driver or drivers of a specific vehicle. For example, vehicle data may include information identifying the current driver, the driver's sex, age, and other personal information that may influence or identify a driver's driving style.

Another type of vehicle data 120 may be weather data. Such data may include temperature, humidity, altitude (barometric pressure), rainfall, etc. It should be noted that weather data may be provided from sensors on the vehicle and/or as external data (which may also include historical weather data).

Yet another type of vehicle data 120 provided may be road conditions. Such data may include road functional class, road surface type, road surface condition, amount of turns and general curvature, altitude, average driving speeds (which may be obtained across multiple drivers and cars), road in the city or highway, reported road incidents history and characteristics (such as potholes, ice, snow, mud, etc.), etc. Road condition data may again be provided from sensors on the vehicle and/or as external data 180. For example, such external data may be obtained from regional government roadway-management agencies. Vehicle data may generally include examples as those discussed in relation to other figures here.

In some embodiments, data analytics engine 130 may be implemented using various methods. Data analytics engine may, utilize, for example simple curve-fitting methods, neural networks, forms of artificial intelligence, etc.

In some embodiments, predictive information 140 may include any information that may be learned and predicted by data analytics engine 130 when data analytics engine 130 is provided with vehicle data 120 and/or external data 180. Generally, predictive information 140 may include information related to products/services that can be provided for the vehicle and/or for the vehicle's driver.

It should be noted that, in some embodiments, vehicle data may be obtained from multiple vehicles as well as multiple drivers. In such embodiments, data analytics engine 130 may be configured to combine/correlate the data from the multiple vehicles and drivers. For example, road data from multiple vehicles may be combined and averaged in order to determine road conditions for specific road segments.

In some embodiments, the predictive information, based at least in part on provided vehicle data 120 and/or external data 180, may include products/services recommendations that are personalized to a particular driver/vehicle. Such personalized recommendations may include optimum equipment replacements and/or upgrades given the particular driver, vehicle, driving conditions/style, etc. For example, data analytics engine 130 may be configured to determine optimum replacements for brakes, tires, engine oil, transmission oil, oil filter, air filter, spark plugs, fuel type, windshield wipers, wax, external protective coatings, bull bars, road debris shields, mud flaps, etc.

In some embodiments, data analytics engine 130 may be configured to generate upgrade recommendations. For example, if the data analytics engine 130 predicts that the driver of a specific vehicle could benefit from more performance, a better engine-mapping unit, a better turbo charger, or the addition of a supercharger may be recommended.

In some embodiments, data analytics engine 130 may be configured to recommend specific service providers, based at least in part on the provided information. For example, if data analytics engine 130 determines that performance upgrades are needed/appropriate, a suitable high-performance shop may be recommended. Alternatively, if the vehicle requires only routine maintenance, such as an oil change, an inexpensive oil-change shop may be recommended.

In some embodiments, certain recommendations/predictive information may be given higher ranking based on other reasons. For example, a certain brake manufacturer may provide incentives in order for brakes made by that manufacturer to be given a higher ranking in the generated predictive information.

Figure 2:
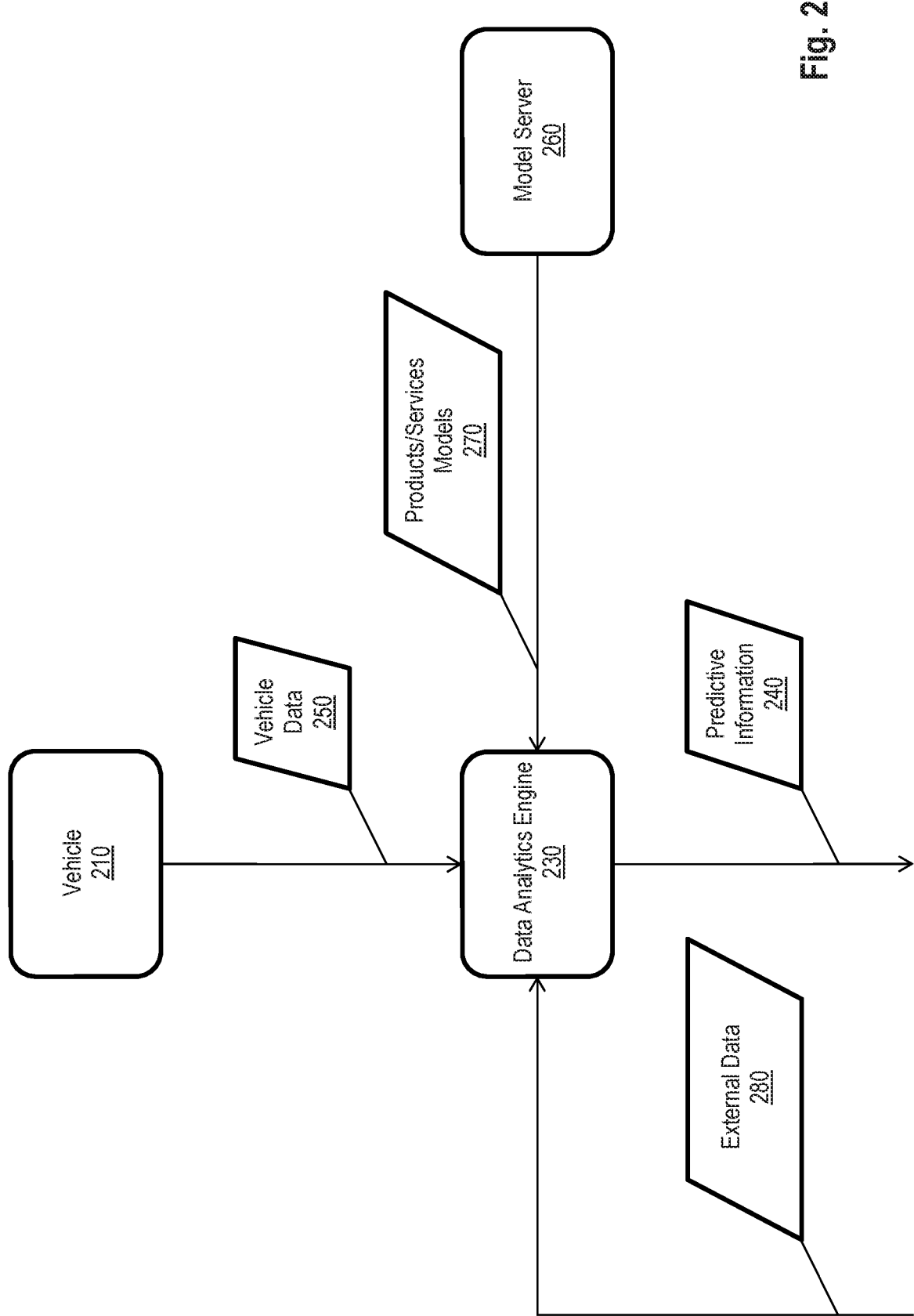
FIG. 2 is a diagram illustrating an alternative system configured to predict information associated with vehicle products/services, in accordance with some embodiments.

FIG. 2 is a diagram illustrating an alternative system configured to predict information associated with vehicle products/services, in accordance with some embodiments.

In some embodiments, vehicle 210 is configured to collect vehicle data 250. Vehicle data 250 may contain information associated with one or more vehicle-related products/services. Vehicle data 250 may then be provided to data analytics engine 230 for processing. In some embodiments, data analytics engine 230 may be configured to generate predictive information 240 that is associated with vehicle data 250.

Generally, vehicle data 250 may include data from sensors on the vehicle as well as other vehicle data (such as environmental data, vehicle history, etc.). Such vehicle data may include weather data, road conditions, personal driving style data, vehicle chassis conditions, wear indicators for several parts, etc. Other examples of vehicle data may include data from on-board radio detection and ranging (RADAR), LIDAR, cameras, ultrasonic sensors, GNSS, accelerometers, anti-lock braking system/electronic stability control (ABS/ESC) sensors, and other vehicle environmental sensors. Vehicle data may also include derivative data that results from the fusion of the sensor data (from any vehicle sensors) and potentially other on-board vehicle data, such as map data or date/time data. For example, various data from on-board sensors may be correlated and associated with the map data and/or with the date/time data. Vehicle data may generally include examples such as those discussed in relation to other figures here.

In some embodiments, data analytics engine 230 may be implemented using various methods. Data analytics engine may utilize simple curve-fitting methods, neural networks, or any other type of artificial intelligence methods.

In some embodiments, external data 280 may also be provided to data analytics engine 130. External data 280 may be related to the one or more products/services and may be data received from one or more external sources other than the vehicle(s). In some embodiments, external data 280 may include map-based data such as road functional class, conditions of various segments of the road, construction areas, road curvature, altitude maps, typical average speeds of various road segments, reported incidents, etc. External data may generally include examples such as those discussed in relation to other figures here.

In some embodiments, additional vehicle data from additional vehicles/drivers may be supplied to data analytics engine 230. In some embodiments, the additional data may be used by data analytics engine to enhance the predictive information with the information collected from the additional vehicles/drivers. Data with similar attributes may be combined (whether in a statistical manner, through neural networks, or otherwise) in order to enhance the predictions. Attributes may include the year, make, and model of the vehicle, the type of brakes on the vehicle, the type of tires on the vehicle, etc. Attributes may also include driving conditions such as weather, road condition, traffic conditions, etc. In addition, attributes may also include specific information about the driver or drivers of each vehicle. Data analytics engine 230 may attribute relatively more significance to additional vehicle data from the same types, or a similar types, of vehicles/drivers. For example, such vehicles/drivers may include, but are not limited to: same or similar vehicle type (e.g., compact car with front-wheel drive, all-wheel drive sport sedan, roadster, SUV, electric vehicle, performance-oriented vehicle, vehicle optimized for high gas mileage, etc.), similar driving style (e.g., aggressive, relaxed, defensive, hypermiling, etc.), similar driving environment (e.g., environmental conditions, such as road conditions, weather conditions, etc.), and the like. As used herein, the phrase "substantially the same" is intended to mean the same, almost the same, approximately the same, or any combination or permutation of those intended meanings.

In embodiments where multiple drivers share a vehicle, each set of the vehicle data may be associated with the driver's identity and be used during the determination of the predictive information. For example, using data from a brake-wear sensor, it can be determined how much brake-wear per mile may be attributed to each driver, etc.

In some embodiments, model server 260 may be configured to provide data analytics engine 230 with products/services models 270. Data analytics engine 230 is configured to combine products/services models 270 with vehicle data 250 and external data 280 in determining predictive information 240. In some embodiments, products/services models 270 may comprise collected and/or processed information about products and services that are being predicted by data analytics engine 230 and are related to the collected vehicle data 250.

Generally, predictive information 240 may include information related to products/services that can be provided to the vehicle and/or the vehicle's driver. In some embodiments, the predictive information, based at least in part on provided vehicle data 250, may include products/services recommendations that are personalized to the driver/vehicle. Such personalized recommendations may include optimum equipment replacements, upgrade recommendations, service providers, etc.

Products/services models 270 may include information that was previously collected and processed. For example, products/services models 270 may include performance information for products such as tires. Information on tires may include, for example, tire information such as wear patterns and other performance based on temperature, road surface, load, acceleration, etc. Other examples of such products/services models may include brakes, engine oil, transmission oil, oil filters, air filters, spark plugs, fuel, engine-mapping units, turbo chargers, superchargers, etc.

Figure 3:
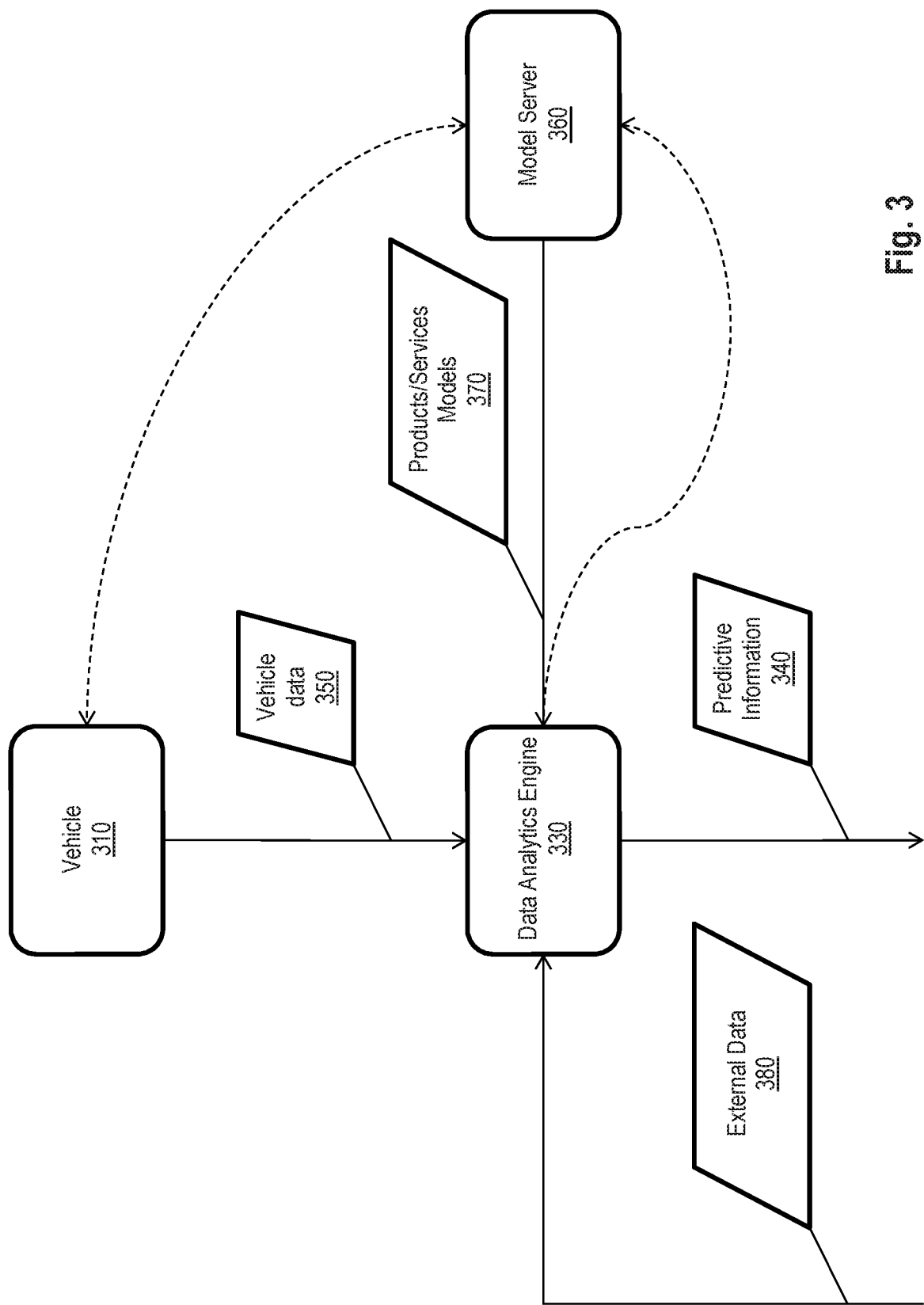
FIG. 3 is a diagram illustrating a system configured to create and/or improve products/services models associated with one or more vehicle products/services, in accordance with some embodiments.

FIG. 3 is a diagram illustrating a system configured to create and/or improve products/services models associated with one or more vehicle products/services, in accordance with some embodiments.

In some embodiments, vehicle 310 is configured to collect vehicle data 350, which contains information associated with one or more vehicle-related products/services. Vehicle data 350 may then be provided to data analytics engine 330 for processing. In some embodiments, data analytics engine 330 may be configured to generate predictive information 340 that is associated with vehicle data 350.

Generally, vehicle data 350 may include data collected from one or more sensors on a vehicle. Vehicle data may include road conditions, personal driving style data, wear indicators, etc. Vehicle data may generally include examples as those discussed in relation to other figures here.

In addition, data analytics engine 330 may also be configured to receive external data 380. External data 380 may include data that is related to the products/services, such as environmental data for example. External data may generally include examples such as those discussed in relation to other figures here.

In some embodiments, data analytics engine 330 may be implemented using various methods. Data analytics engine may utilize simple curve-fitting methods, neural networks, artificial intelligence methods, etc.

In some embodiments, model server 360 may be configured to provide to data analytics engine 330 products/services models 370. Data analytics engine 330 may be configured to combine products/services models 370 with vehicle data 350 in determining predictive information 340.

In some embodiments, products/services models 370 may comprise collected and/or processed information, related to vehicle data 350, that is being predicted by data analytics engine 330.

Generally, predictive information 340 may include information related to products/services that can be provided to the vehicle and the vehicle's driver. In some embodiments, the predictive information, based at least in part on provided vehicle data 350, may include products/services recommendations that are personalized to the driver/vehicle. Such personalized recommendations may include optimum equipment replacements, upgrade recommendations, service providers, etc.

Products/services models 370 may include information that was previously collected and processed. For example, products/services models 370 may include performance information for products such as tires. Information on tires may include, for example, wear patterns and other performance indicators that are based on temperature, road surface, load, acceleration, etc. Other examples of such products/services models may include brakes, engine oil, transmission oil, oil filters, air filters, spark plugs, fuel, engine-mapping units, turbo chargers, superchargers, etc.

In some embodiments, data from the data analytics engine 330 may be used to provide feedback to model server 360 in order for model server 360 to improve products/services models 370. In some embodiments, if no model exits for a particular product or service, the model may be created for that particular product or service using information/feedback received from data analytics engine 330. In other embodiments, information/feedback provided by services/product models 370 may be added to and improve products/services 370.

In some embodiments, additional vehicle data from additional vehicles/drivers may be supplied to data analytics engine 330. In some embodiments, the additional data may be used by data analytics engine to enhance predictive information 340 with the information collected from the additional vehicles/drivers. Data with similar attributes may be combined (whether in a statistical manner, through neural networks, or otherwise) in order to enhance the predictions. Attributes may include the year, make, and model of the vehicle, the type of brakes on the vehicle, the type of tires on the vehicle, etc. Attributes may also include driving conditions such as weather, road condition, traffic conditions, etc. In addition, attributes may also include specific information about the driver or drivers of each vehicle.

In embodiments where multiple drivers share a vehicle, each set of the vehicle data may be associated with the driver's identity and be used during the determination of the predictive information. For example, using data from a brake wear sensor, it can be determined how much brake wear can be attributed to each driver per mile, etc.

In some embodiments, model server 360 may be configured to provide feedback information for improving sensors 310. The feedback information may be provided, for example, from the products/services models that were created and updated/improved at model server 360. In some embodiments, feedback provided by model server 360 may be used, for example, in choosing what type of sensors to set up on a vehicle, what type of data to collect from those sensors, how to distill the data before transmission, etc.

Figure 4:
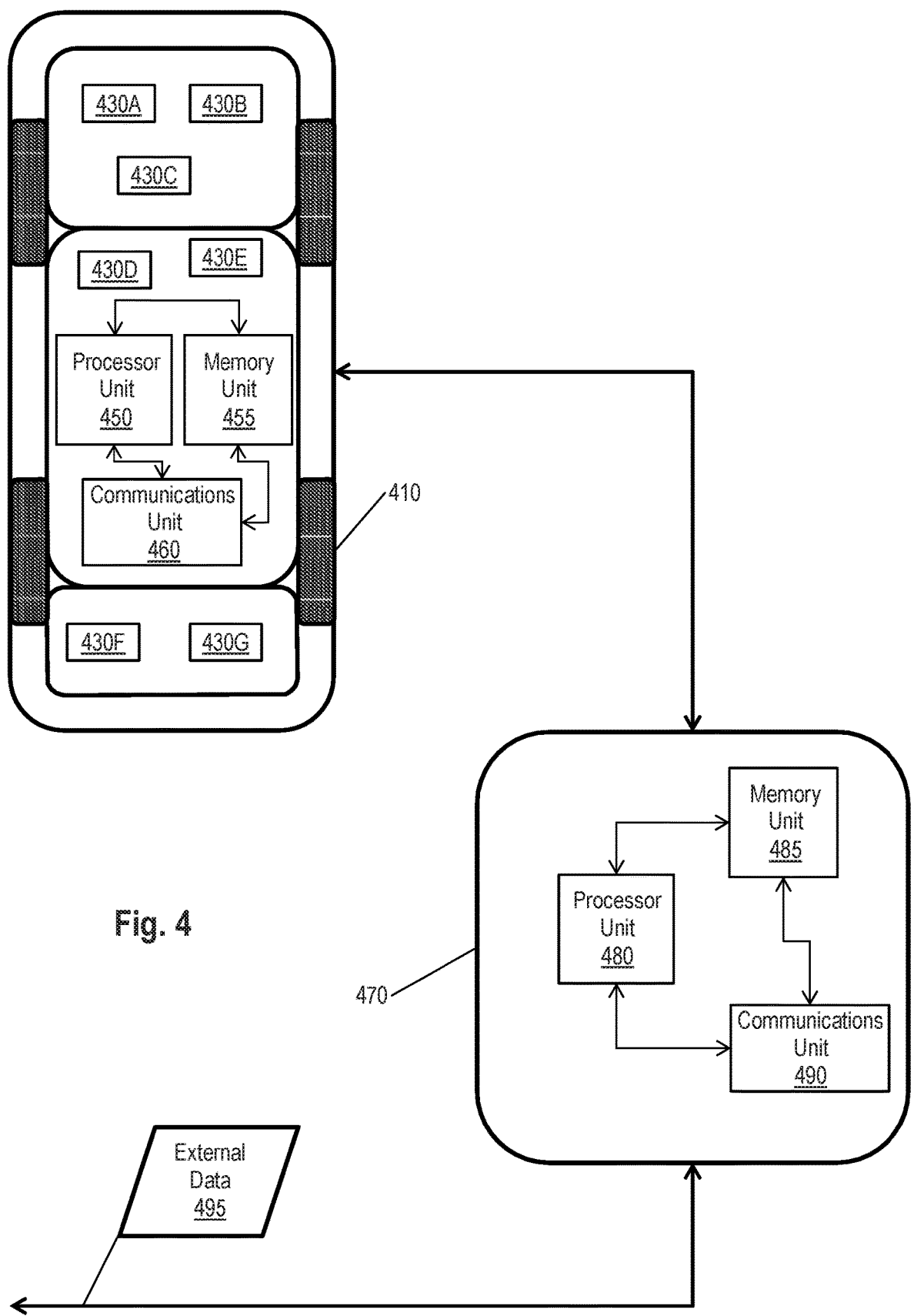
FIG. 4 is a diagram illustrating a vehicle and a server configured to predict information associated with vehicle products/services, in accordance with some embodiments.

FIG. 4 is a diagram illustrating a vehicle and a server configured to predict information associated with vehicle products/services, in accordance with some embodiments.

In some embodiments, vehicle 410 may include one or more processor units (such as processor unit 450), one or more memory units (such as memory unit 455, which are coupled to processor unit 450), and one or more communications units (such as communications unit 460, which is also coupled to processor 450 and/or memory unit 455). In some embodiments, vehicle 410 may also include one or more sensors, such as sensors 430A-G.

In some embodiments, sensors 430A-G are configured to collect information associated with one or more vehicle-related products/services. Vehicle data, which may include data other than the sensor data, may be provided to processor unit 450 and/or stored in memory unit 455. Processor unit 450 may be configured to preprocess the vehicle data before the vehicle data is transmitted to another location (such as server 470) for additional processing.

In some embodiments, some preprocessing of the data may occur in order to distill the data to a smaller size prior to transmission. For example, there may be vehicle data obtained from two different sensors that contains the same or very similar information. In such a case, only data from one of the sensors may be sent. Additional types of preprocessing, such as general compression, may also be performed locally on the vehicle before the vehicle data is transmitted to server 470.

In some embodiments, communications unit 460 is configured to establish a connection, either direct or indirect, with communications unit 490 of server 470. In some embodiments, server 470 may also include one or more processor units (such as processor unit 480), one or more memory units (such as memory unit 485, which is coupled to processor unit 480), and one or more communications units (such as communications unit 490, which is also coupled to processor 480 and/or memory unit 485).

In some embodiments, server 470 may be configured to generate predictive information that is associated with the vehicle data received from vehicle 410. In some embodiments, server 470 may also be configured to receive external data 495 that may include other data related to the vehicle data (such as environmental data).

In some embodiments, server 470 may be configured to apply various methods in generating predictive information. For example, server 470 may utilize simple curve-fitting methods, neural networks, artificial intelligence methods, etc.

In some embodiments, server 470 may be configured to store, generate, and/or update products/services models. In some embodiments, server 470 may be configured to combine products/services models with the vehicle data and the external data in determining the predictive information. In some embodiments, the products/services models may comprise collected and/or processed information about products and services that are being predicted by server 470 and are related to the vehicle data. In some embodiments, server 470 may be configured to improve the products/services models using the vehicle data and other external data provided to the server.

Generally, the predictive information may include information related to products/services that can then be provided to the vehicle and the vehicle's driver. The information may be sent back to the vehicle or the information may be sent to a designated email address, phone number, dealership, service provider, retail store, etc.

In some embodiments, the predictive information, based at least in part on the provided vehicle data, may include products/services recommendations that are personalized to the driver/vehicle. Such personalized recommendations may include optimum equipment replacements, upgrade recommendations, service providers, etc.

The products/services models may include information that was previously collected and processed. For example, the products/services models may include performance information for products such as tires. Information on tires may include, for example, tire information such as wear patterns and other performance based on temperature, road surface, load, acceleration, etc. Other examples of such products/services models may include brakes, engine oil, transmission oil, oil filters, air filters, spark plugs, fuel, engine-mapping units, turbo chargers, superchargers, etc. In some embodiments, server 470 may be configured to create and/or improve the products/services models using the information provided to server 470 (such as the vehicle data and the external data).

In some embodiments, additional vehicle data from additional vehicles/drivers may be supplied to server 470. In some embodiments, the additional data may be combined with the other information provided to server 470 in order to enhance the generated predictive information and/or the products/services models.

Figure 5:
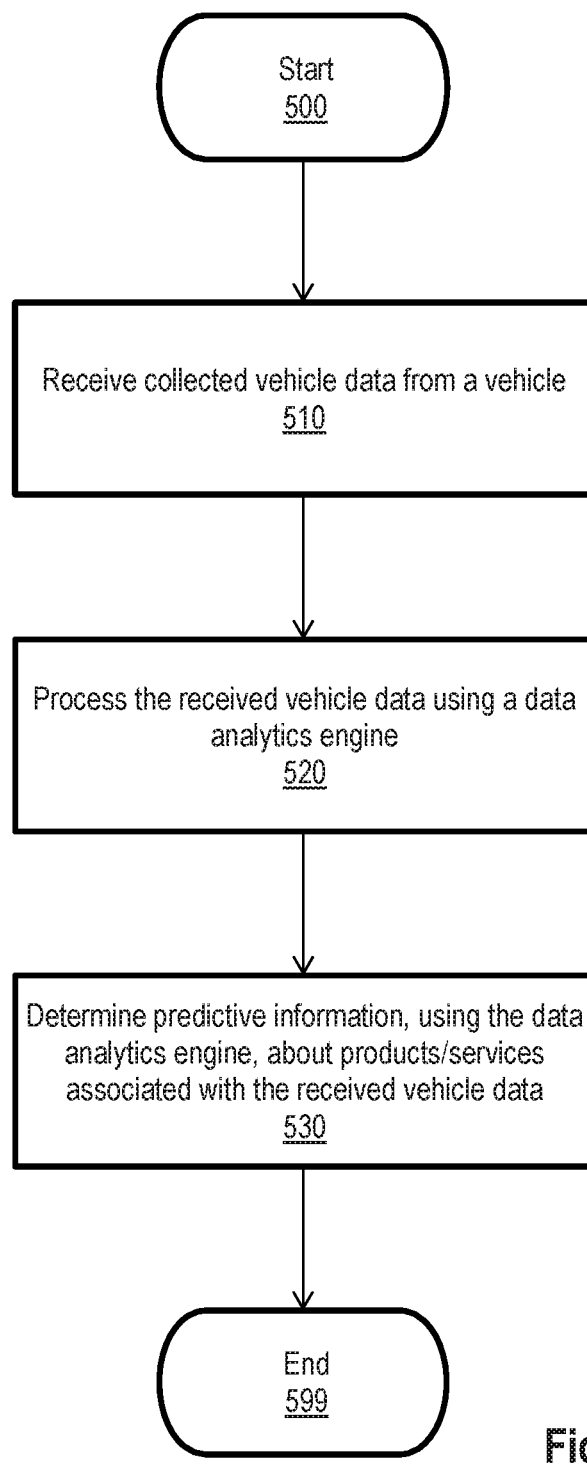
FIG. 5 is a flow diagram illustrating a method for predicting information associated with vehicle products/services, in accordance with some embodiments.

FIG. 5 is a flow diagram illustrating a method for predicting information associated with vehicle products/services, in accordance with some embodiments.

In some embodiments, the method described here may be performed by one or more of the systems described in FIGS. 1-4.

Processing begins at 500 where, at block 510, collected vehicle data from a vehicle is received. In some embodiments, the collected data may be related to one or more products/services associated with a vehicle.

At block 520, the received processed data is processed using a data analytics engine. In some embodiments, data analytics engine may be implemented using various methods. Data analytics engine may utilize simple curve-fitting methods, neural networks, artificial intelligence methods, etc.

At block 530, the data analytics engine determines predictive information about the products/services associated with the received vehicle data.

Processing subsequently ends at 599.

Figure 6:
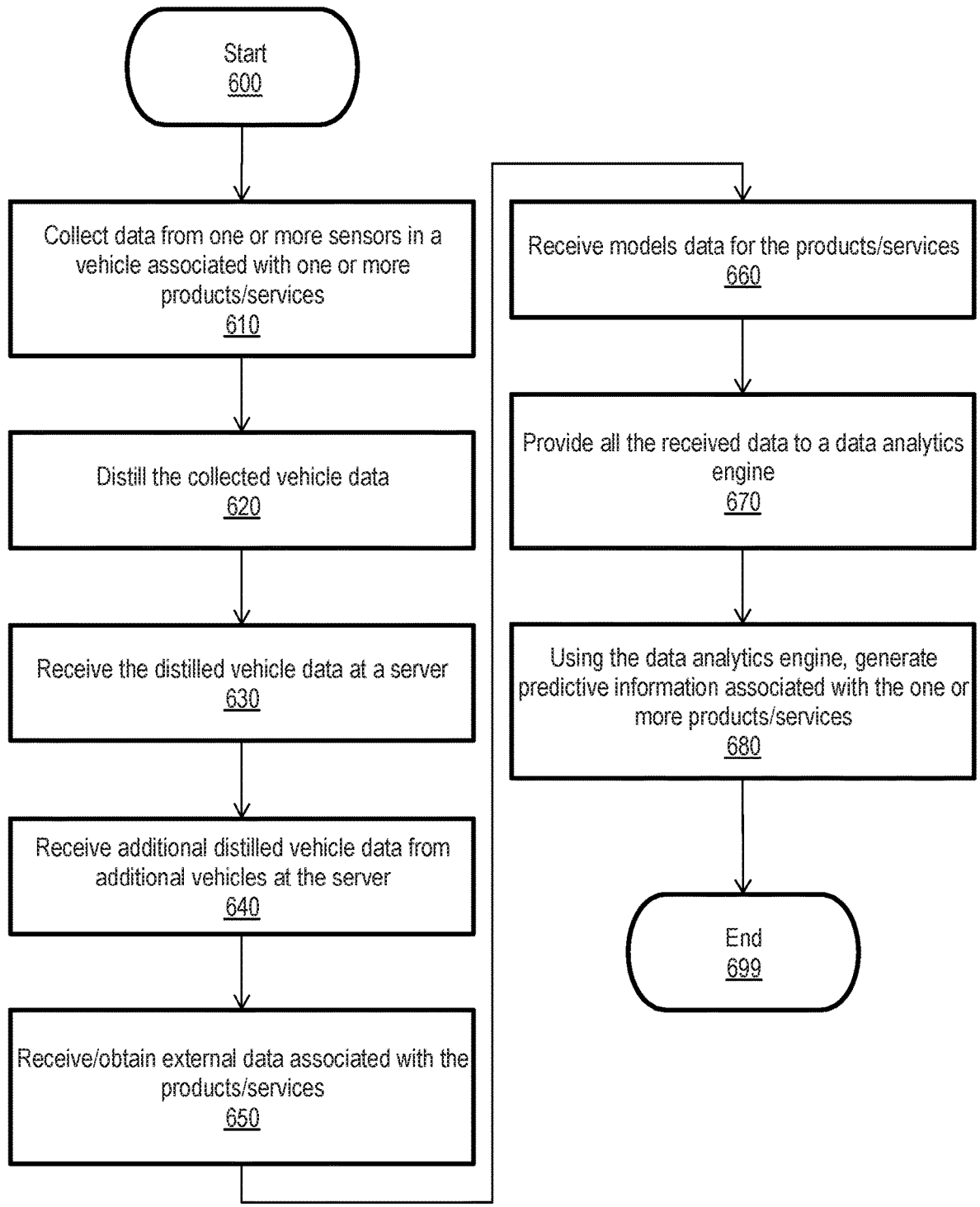
FIG. 6 is a flow diagram illustrating an alternative method for predicting information associated with vehicle products/services, in accordance with some embodiments.

FIG. 6 is a flow diagram illustrating an alternative method for predicting information associated with vehicle products/services, in accordance with some embodiments.

In some embodiments, the method described here may be performed by one or more of the systems described in FIGS. 1-4.

Processing begins at 600 where, at block 610, data is collected from one or more sensors on a vehicle. The vehicle data is associated with one or more vehicle-related products/services.

At block 620, the collected vehicle data is distilled. In some embodiments, the vehicle data is reduced in size to better facilitate the transmission of the data. For example, duplicate data may be removed. Generally, a compression of the data may be performed.

At block 630, the distilled vehicle data is received at a server where the vehicle data is to be combined with additional data and/or go through additional processing.

At block 640, additional vehicle data from additional vehicles/drivers is received at the server. In some embodiments, the additional vehicle data further enhances the results determined at the server when the vehicle data is processed.

At block 650, external data, associated with the one or more products/services, is received/obtained at the server. In some embodiments, external data may be any data that may enhance the results generated by the server that are associated with the products/services and/or the vehicle data.

At block 660, models for the products/services are received at the server. In some embodiments, products/services models may include information that was previously collected and processed about the products/services. For example, the products/services models may include performance information for products such as tires, brakes, engine oil, transmission oil, oil filters, air filters, spark plugs, fuel, engine-mapping units, turbo chargers, superchargers, etc.

At block 670, all the received data is provided to a data analytics engine.

At block 680, using the data analytics engine, predictive information associated with the one or more products/services is generated.

Processing subsequently ends at 699.

Figure 7:
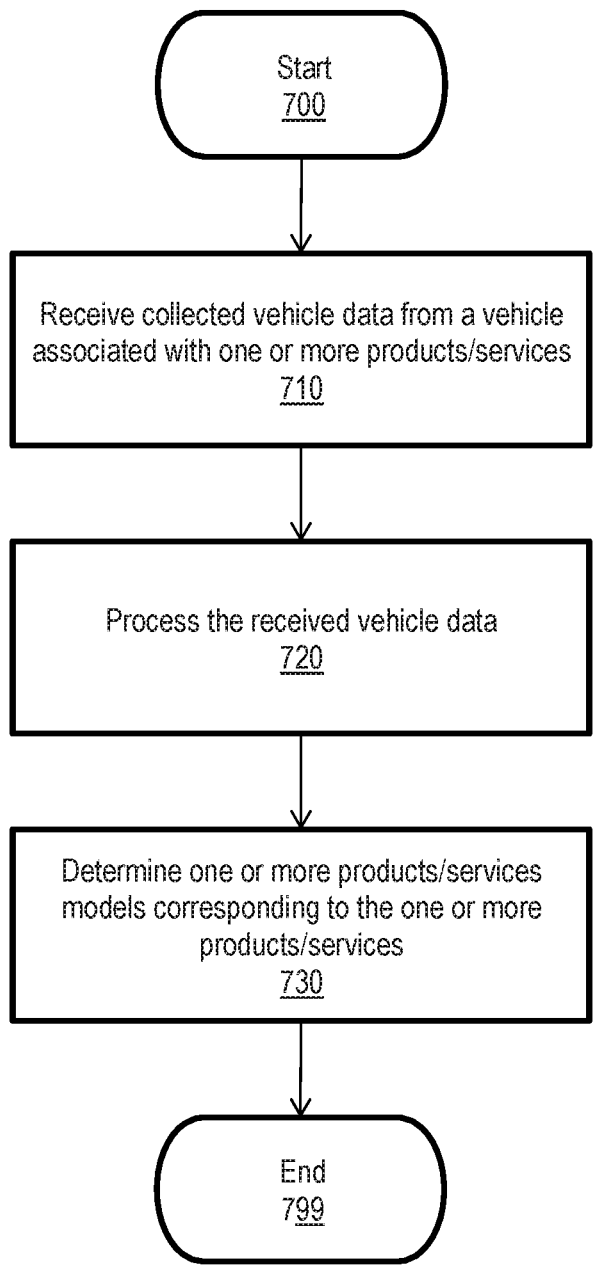
FIG. 7 is a flow diagram illustrating a method for creating and/or improving products/services models associated with vehicle products/services, in accordance with some embodiments.

FIG. 7 is a flow diagram illustrating a method for creating and/or improving products/services models associated with vehicle products/services, in accordance with some embodiments.

In some embodiments, the method described here may be performed by one or more of the systems described in FIGS. 1-4.

Processing begins at 700 where, at block 710, collected vehicle data from a vehicle is received. In some embodiments, the vehicle data is associated with one or more vehicle-related products/services.

At block 720, the received vehicle data is analyzed and processed, and at block 730, one or more models corresponding to the one or more products/services are determined. In some embodiments, products/services models may include information that was previously collected and processed. For example, the products/services models may include performance information for products such as tires, brakes, engine oil, transmission oil, oil filters, air filters, spark plugs, fuel, engine-mapping units, turbo chargers, superchargers, etc.

Processing subsequently ends at 799.

Figure 8:
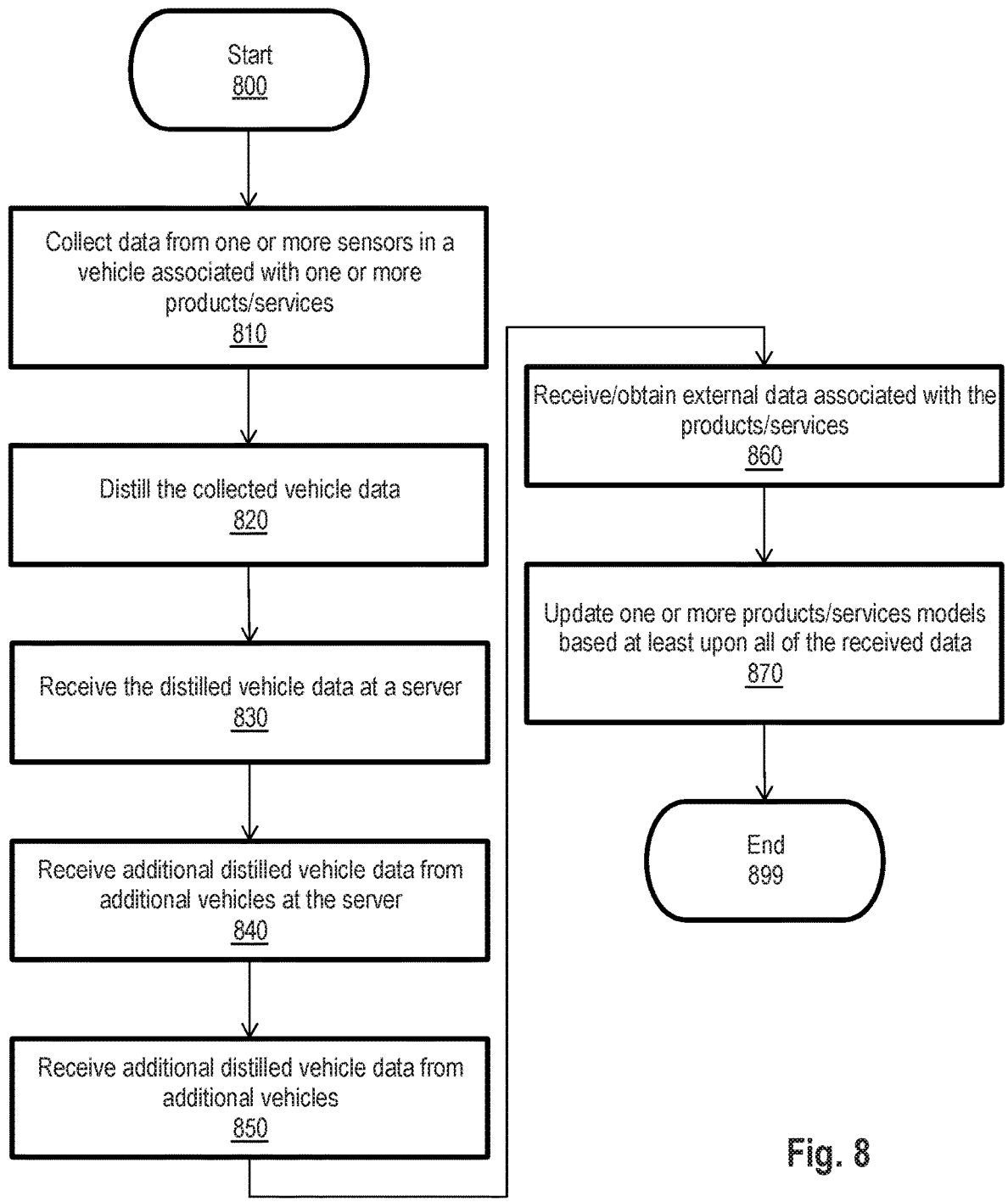
FIG. 8 is a flow diagram illustrating an alternative method for creating and/or improving products/services models associated with vehicle products/services, in accordance with some embodiments.

FIG. 8 is a flow diagram illustrating an alternative method for creating and/or improving products/services models associated with vehicle products/services, in accordance with some embodiments.

In some embodiments, the method described here may be performed by one or more of the systems described in FIGS. 1-4.

Processing begins at 800 where, at block 810, data is collected from one or more sensors in a vehicle associated with one or more vehicle-related products/services.

At block 820, the collected vehicle data is distilled. In some embodiments, the vehicle data is reduced in size to better facilitate the transmission of the data. For example, duplicate data may be removed. Generally, a compression of the data may be performed. At block 830, the distilled vehicle data is received at a server.

At block 840, additional distilled data is received at the server from additional vehicles/drivers. In some embodiments, the additional vehicle data further enhances the results determined at the server when the vehicle data is processed.

At block 850, additional distilled vehicle data is received from additional vehicles.

At block 860, external data associated with the one or more products/services is received/obtained at the server. In some embodiments, external data may be any data that may enhance the results generated by the server that are associated with the products/services and/or the vehicle data.

At block 870, one or more products/services models are updated based at least upon the received data. In some embodiments, products/services models may include information that was previously collected and processed. For example, the products/services models may include performance information for products such as tires, brakes, engine oil, transmission oil, oil filters, air filters, spark plugs, fuel, engine-mapping units, turbo chargers, superchargers, etc.

Processing subsequently ends at 899.

One or more embodiments of the invention are described above. It should be noted that these and any other embodiments are exemplary and are intended to be illustrative of the invention rather than limiting. While the invention is widely applicable to various types of systems, a skilled person will recognize that it is impossible to include all of the possible embodiments and contexts of the invention in this disclosure. Upon reading this disclosure, many alternative embodiments of the present invention will be apparent to persons of ordinary skill in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations that follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

The invention claimed is:

1. A method of collecting vehicle-part performance information for facilitating improved vehicle performance under actual driving conditions of a vehicle, the method comprising:

operating a first vehicle by a first driver and disposing a plurality of sensors at the first vehicle;

operating a second vehicle by a second driver;

providing a neural network and training the neural network to learn to make predictions using received data;

receiving, at a first server that includes a processor, vehicle data from the first vehicle and additional vehicle data from the second vehicle, the processor being disposed at a central location, wherein the vehicle data and the additional vehicle data are associated, at least in part, with one or more vehicle-related products and wherein the vehicle data and the additional vehicle data are collected, at least in part, from sensors including on-board RADAR sensors, accelerometers, and ABS/ESC sensors and are correlated and associated with map data;

receiving, at the processor, external data, wherein the external data is associated, at least in part, with the one or more vehicle-related products; and wherein the external data is not from devices associated with the first vehicle, not from the second vehicle, and includes road condition data;

at a second server, maintaining and storing one or more product models, the product models being data structures;

determining, by the processor and using the trained neural network, one or more predictions associated with the one or more vehicle-related products, wherein the one or more predictions include product recommendations that are personalized to the first vehicle, include optimum equipment replacement parts for the first vehicle, and are based, at least in part, on the vehicle data, on the additional vehicle data, on the external data, and on the one or more product models, the models including performance information concerning the one or more vehicle-related products;

wherein the predictions are determined by applying the external data, vehicle data, and the additional vehicle data to the trained neural network;

wherein the processor attributes more significance to the additional vehicle data when the second vehicle is the same type of vehicle as the first vehicle;

wherein the one or more product models are associated, at least in part, with the one or more vehicle-related products and wherein the optimum equipment replacement parts for the first vehicle include at least one of: brakes, tires, engine oil, transmission oil, oil filter, air filter, spark plugs, fuel type, and windshield wipers;

selectively sending an electronic message from the first server to the second server to perform an action, the action being creating a new product model, or modifying a selected one of the one or more product models;

selectively sending electronic signals from the second server to the first vehicle, the signals being effective in selecting a sensor from the plurality of sensors to set up on the first vehicle and a type of data to collect from the selected sensors;

wherein the one or more predictions are used to perform an action, the action being replacing a part on the first vehicle with a selected one of the optimum replacement parts.

2. The method of claim 1, wherein the vehicle data comprises at least one of: data collected by the plurality of sensors on the first vehicle, and vehicle identification/history data.

3. The method of claim 1, wherein receiving vehicle data comprises receiving distilled vehicle data, wherein the distilled vehicle data is obtained by compressing the size of the vehicle data.

4. The method of claim 1, further comprising improving the one or more products models based, at least in part, on the vehicle data and on the external data.

5. The method of claim 1, wherein the determining comprises correlating data having similar attributes.

6. The method of claim 1, wherein the external data is received from one or more external sources other than the first vehicle and the second vehicle.

7. The method of claim 1, wherein the one or more predictions is specific and unique as to the first driver of the first vehicle.

8. The method of claim 1, wherein predictive brake wear information is generated in response to brake wear attributed to a unique driver.

9. A system for collecting vehicle-part performance information for facilitating improved vehicle performance under actual driving conditions of a vehicle, the system comprising:
a first vehicle operated by a first driver and a plurality of sensors at the first vehicle;
a second vehicle operated by a second driver;
a neural network that is trained to learn to make predictions using received data;
a first server that includes one or more processors coupled to one or more memory units;
a second server that is configured to maintain and store one or more product models, the product models being data structures;
wherein the one or more processors are disposed at a central location and are configured to:
receive vehicle data from the first vehicle and additional vehicle data from the second vehicle, wherein the vehicle data is associated, at least in part, with one or more vehicle-related products and wherein the vehicle data and the additional vehicle data are collected, at least in part, from sensors including on-board RADAR sensors, accelerometers, and ABS/ESC sensors and are correlated and associated with map data;
receive external data, wherein the external data is associated, at least in part, with the one or more vehicle-related products and wherein the external data is from devices not associated with the first vehicle, not from the second vehicle, and includes road condition data; and
determine one or more predictions associated with the one or more vehicle-related products, wherein the one or more predictions include product recommendations that are personalized to the first vehicle, include optimum equipment replacement parts for the first vehicle, and are based, at least in part, on the vehicle data, on the additional vehicle data, on the external data, and on one or more product models, the models including performance information concerning the one or more vehicle-related products;
wherein the predictions are determined by applying the external data, vehicle data, and the additional vehicle data to the trained neural network;
wherein the one or more processors attribute more significance to the additional vehicle data when the second vehicle is the same type of as the first vehicle;
wherein the one or more product models are associated, at least in part, with the one or more vehicle-related products and wherein the optimum equipment replacement parts for the first vehicle include at least one of: brakes, tires, engine oil, transmission oil, oil filter, air filter, spark plugs, fuel type, and windshield wipers;
wherein an electronic message is selectively sent from the first server to the second server to perform an action, the action being creating a new product model, or modifying a selected one of the one or more product models;
wherein electronic signals are selectively sent from the second server to the first vehicle, the signals being effective in selecting a sensor from the plurality of sensors to set up on the first vehicle and a type of data to collect from the selected sensors;
wherein the one or more predictions are used to perform an action, the action being replacing a part on the vehicle with a selected one of the optimum replacement parts.

10. The system of claim 9, wherein the vehicle data comprises at least one of: data collected by the plurality of sensors on the first vehicle, and vehicle identification/history data.

11. The system of claim 9, wherein receiving vehicle data comprises receiving distilled vehicle data, wherein the distilled vehicle data is obtained by compressing the size of the vehicle data.

12. The system of claim 9, further comprising the one or more processors being configured to improve the one or more products models based, at least in part, on the vehicle data and on the external data.

13. The system of claim 9, wherein the determining comprises the one or more processors being configured to correlate data having similar attributes.

14. The system of claim 9, wherein the external data is received from one or more external sources other than the first vehicle and the second vehicle.

15. The system of claim 9, wherein the one or more predictions is specific and unique as to the first driver of the first vehicle.

16. The system of claim 9, wherein predictive brake wear information is generated in response to brake wear attributed to a unique driver.

17. At least one non-transitory, machine-accessible storage medium at a first server having instructions for collecting vehicle-part performance information for facilitating improved vehicle performance under actual driving conditions of a vehicle stored thereon, wherein a first vehicle is operated by a first driver and a plurality of sensors are disposed at the first vehicle, wherein a second vehicle is operated by a second driver, wherein a neural network is trained to learn to make predictions using received data, wherein a second server is configured to maintain and store one or more product models, the product models being data structures, and wherein the instructions are configured, when executed on a machine, to cause the machine to:
  receive vehicle data from the first vehicle and additional vehicle data from the second vehicle, wherein the vehicle data is associated, at least in part, with one or more vehicle-related products and wherein the vehicle data and the additional vehicle data are collected, at least in part, from sensors including on-board RADAR sensors, accelerometers, and ABS/ESC sensors and are correlated and associated with map data;
  receive external data, wherein the external data is associated, at least in part, with the one or more vehicle-related products and wherein the external data is from devices not associated with the first vehicle, not from the second vehicle, and includes road condition data; and
  determine one or more predictions associated with the one or more vehicle-related products, wherein the one or more predictions include product recommendations that are personalized to the first vehicle, include optimum equipment replacement parts for the first vehicle, and are based, at least in part, on the vehicle data, on the additional vehicle data, on the external data, and on one or more product models, the models including performance information concerning vehicle-related products;
  wherein the predictions are determined by applying the external data, vehicle data, and the additional vehicle data to the trained neural network;
  wherein more significance is attributed to the additional vehicle data when the second vehicle is the same type of as the first vehicle;
  wherein the one or more product models are associated, at least in part, with the one or more vehicle-related products and wherein the optimum equipment replacement parts for the first vehicle include at least one of: brakes, tires, engine oil, transmission oil, oil filter, air filter, spark plugs, fuel type, and windshield wipers;
  wherein an electronic message is selectively sent from the first server to the second server to perform an action, the action being creating a new product model, or modifying a selected one of the one or more product models;
  wherein electronic signals are selectively sent from the second server to the first vehicle, the signals being effective in selecting a sensor from the plurality of sensors to set up on the first vehicle and a type of data to collect from the selected sensors;
  wherein the one or more predictions are used to perform an action, the action being replacing a part on the vehicle with a selected one of the optimum replacement parts.

18. The at least one storage medium of claim 17, wherein the vehicle data comprises at least one of: data collected by the plurality of sensors on the first vehicle, and vehicle identification/history data.

19. The at least one storage medium of claim 17, wherein receiving vehicle data comprises receiving distilled vehicle data, wherein the distilled vehicle data is obtained by compressing the size of the vehicle data.

20. The at least one storage medium of claim 17, further comprising the instructions being configured to improve the one or more products models based, at least in part, on the vehicle data and on the external data.

21. The at least one storage medium of claim 17, wherein the determining comprises the instructions being configured to correlate data having similar attributes.

22. The at least storage medium of claim 17, wherein the external data is received from one or more external sources other than the vehicle and the second other vehicle.

23. The at least storage medium of claim 17, wherein the one or more predictions is specific and unique as to the first driver of the first vehicle.

24. The at least storage medium of claim 17, wherein predictive brake wear information is generated in response to brake wear attributed to a unique driver.

25. A method of collecting vehicle-part performance information for facilitating improved vehicle performance under actual driving conditions of a vehicle and being personalized to individual drivers of the vehicle and the style of driving for the individual drivers, the method comprising:
  operating a first vehicle by a first driver and disposing a plurality of sensors at the first vehicle;
  operating a second vehicle by a second driver;
  providing a neural network and training the neural network to learn to make predictions using received data;
  receiving, at a first server that includes a processor, vehicle data from a first vehicle and additional vehicle data from the second vehicle, the processor being disposed at a central location, wherein the vehicle data and the additional vehicle data are associated, at least in part, with one or more vehicle-related products and wherein the vehicle data and the additional vehicle data are collected, at least in part, from sensors including on-board RADAR sensors, accelerometers, and ABS/ESC sensors and are correlated and associated with map data;
  wherein the vehicle data includes data relating to the driving style of each of a plurality of drivers of the vehicle and wherein at least some of the vehicle data is correlated to each of the plurality of drivers of the vehicle;
  receiving, at the processor, external data, wherein the external data is associated, at least in part, with the one or more vehicle-related products; and
  wherein the external data is not from devices associated with the first vehicle, not from the second vehicle, and includes road condition data;

at a second server, maintaining and storing one or more product models, the product models being data structures;

determining, by the processor, one or more predictions associated with the one or more vehicle-related products and the wear or usage of one or more vehicle related components, wherein the one or more predictions (1) include product recommendations, (2) identify wear or usage of the one or more vehicle components that is attributable to each of the drivers the first vehicle, (3) include optimum equipment replacement parts for the first vehicle, and (4) are based, at least in part, on the vehicle data, on the additional vehicle data, on the external data, on driver identity, and on one or more product models, the models including performance information concerning the one or more vehicle-related products;

wherein the predictions are determined by applying the external data, vehicle data, and the additional vehicle data to the trained neural network;

wherein the processor attributes more significance to the additional vehicle data when the second vehicle is the same type of as the first vehicle;

wherein the one or more product models are associated, at least in part, with the one or more vehicle-related products and wherein the optimum equipment replacement parts for the first vehicle include at least one of: brakes, tires, engine oil, transmission oil, oil filter, air filter, spark plugs, fuel type, and windshield wipers;

selectively sending an electronic message from the first server to the second server to perform an action, the action being creating a new product model, or modifying a selected one of the one or more product models;

selectively sending electronic signals from the second server to the first vehicle, the signals being effective in selecting a sensor from the plurality of sensors to set up on the first vehicle and a type of data to collect from the selected sensors;

wherein the one or more predictions are used to perform an action, the action being replacing a part on the vehicle with a selected one of the optimum replacement parts.

26. The method of claim 25, wherein the vehicle data comprises at least one of: data collected by one or more sensors on the first vehicle, and vehicle identification/history data.

27. The method of claim 25, wherein receiving vehicle data comprises receiving distilled vehicle data, wherein the distilled vehicle data is obtained by compressing the size of the vehicle data.

28. The method of claim 25, further comprising improving the one or more products/services models based, at least in part, on the vehicle data and on the external data.

29. The method of claim 25, wherein the determining comprises correlating data having similar attributes.

* * * * *